US009923200B2

United States Patent
Wang et al.

(10) Patent No.: US 9,923,200 B2
(45) Date of Patent: Mar. 20, 2018

(54) METHOD FOR MAKING SULFUR-GRAPHENE COMPOSITE MATERIAL

(71) Applicants: Tsinghua University, Beijing (CN); HON HAI PRECISION INDUSTRY CO., LTD., New Taipei (TW)

(72) Inventors: Li Wang, Beijing (CN); Xiang-Ming He, Beijing (CN); Jian-Jun Li, Beijing (CN); Jian-Wei Guo, Beijing (CN); Wen-Ting Sun, Beijing (CN); Jian-Guo Ren, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 12 days.

(21) Appl. No.: 15/341,004

(22) Filed: Nov. 2, 2016

(65) Prior Publication Data
US 2017/0054149 A1     Feb. 23, 2017

Related U.S. Application Data

(63) Continuation of application No. 13/554,120, filed on Jul. 20, 2012.

(30) Foreign Application Priority Data

Dec. 28, 2011 (CN) .......................... 2011 1 0447288

(51) Int. Cl.
*H01M 4/36*      (2006.01)
*B05D 3/10*      (2006.01)
(Continued)

(52) U.S. Cl.
CPC .............. *H01M 4/366* (2013.01); *B05D 1/18* (2013.01); *B05D 3/107* (2013.01); *H01M 4/38* (2013.01);
(Continued)

(58) Field of Classification Search
CPC ...... H01M 4/366; H01M 4/38; H01M 4/5815; H01M 4/583; H01M 4/587; H01M 4/625;
(Continued)

(56) References Cited

U.S. PATENT DOCUMENTS 5,225,227 A * 7/1993 Yalpani .................... A23G 9/52
426/531
2009/0134040 A1* 5/2009 Gordon ..................... C25B 1/00
205/560

(Continued)

FOREIGN PATENT DOCUMENTS

CN      101830459 A * 9/2010

OTHER PUBLICATIONS

Chen, J., Jia, X., She, Q., Wang, C., Zhang, Q., Zheng, M., Dong, Q., "The Preparation of Nano-Sulfu/MWCNTs and Its Electrochemical Performance", 2010, Electrochimica Acta, 55, p. 8062-8066.*

(Continued)

*Primary Examiner* — Gordon Baldwin
*Assistant Examiner* — Christina D McClure
(74) *Attorney, Agent, or Firm* — ScienBiziP, P.C.

(57) ABSTRACT

A method for making a sulfur-graphene composite material is provided. In the method, an elemental sulfur solution and a graphene dispersion are provided. The elemental sulfur solution includes a first solvent and an elemental sulfur dissolved in the first solvent. The graphene dispersion includes a second solvent and graphene sheets dispersed in the second solvent. The elemental sulfur solution is added to the graphene dispersion, a number of elemental sulfur particles are precipitated and attracted to a surface of the graphene sheets to form the sulfur-graphene composite material. The sulfur-graphene composite material is separated from the mixture.

8 Claims, 4 Drawing Sheets

(51) Int. Cl.

| | | |
|---|---|---|
| *H01M 10/0525* | (2010.01) | |
| *B05D 1/18* | (2006.01) | |
| *H01M 4/58* | (2010.01) | |
| *H01M 4/587* | (2010.01) | |
| *H01M 4/38* | (2006.01) | |
| *H01M 4/583* | (2010.01) | |
| *H01M 4/62* | (2006.01) | |
| *H01M 4/02* | (2006.01) | |

(52) U.S. Cl.
CPC ........... *H01M 4/583* (2013.01); *H01M 4/587* (2013.01); *H01M 4/5815* (2013.01); *H01M 4/625* (2013.01); *H01M 10/0525* (2013.01); *H01M 4/382* (2013.01); *H01M 2004/026* (2013.01)

(58) Field of Classification Search
CPC .............. H01M 4/382; H01M 10/0525; H01M 2004/026; B05D 1/18; B05D 3/107
USPC ........................................................ 427/430.1
See application file for complete search history.

(56) References Cited

U.S. PATENT DOCUMENTS

| | | | | |
|---|---|---|---|---|
| 2010/0150817 | A1* | 6/2010 | Abry | .................. C01B 17/0237 423/567.1 |
| 2011/0292570 | A1* | 12/2011 | Ivanovici | ............... B82Y 30/00 361/502 |
| 2012/0088154 | A1* | 4/2012 | Liu | ........................ B82Y 30/00 429/213 |

OTHER PUBLICATIONS

Dryer, D., Park,S., Bielawski, C., Ruoff, R., "The Chemistry of Graphene Oxide", 2010, Chem. Soc. Rev., 39, p. 228-240.*
Encyclopedia.com, "Sulfur", 2006, p. 1-9.*
Rastogi, R., Kaushal, R., Tripathi, S., Sharma, A., Kaur, I., Bharadwaj, L., "Comparative Study of Carbon Nanotube Dispersion Using Surfactants", 2008, J. Colloid Interface Sci., 328, p. 421-428.*
Wang, C., Chen, J., Shi, Y., Zheng, M., Dong, Q., "Preparation and Performance of a Core-Shell Carbon/Sulfur Material for Lithium/Sulfur Battery", 2010, Electrochimica Acta, 55, p. 7010-7015.*
Wang, H., Yang, Y., Liang, Y., Robinson, J., Li, Y., Jackson, A., Cui, Y., Dai, H., "Graphene-Wrapped Sulfur Particles as a Rechargeable Lithium-Sulfur Battery Cathode Material with High Capacity and Cycling Stability", 2011, Nano Lett., 11, p. 2644-2647.*
Wang, H., Yang, Y., Liang, Y., Robinson, J., Li, Y., Jackson, A., Cui, Y., Dai, H., "Supporting Information for Graphene-Wrapped Sulfur Particles as a Rechargeable Lithium-Sulfur Battery Cathode Material with High Capacity and Cycling Stability", 2011, Nano Lett., 11, p. 1-5.*
Cao, CN 101830459 A, Machine Translation, Originally Published 2010, p. 1-19.*
Si, Y., Samulski, E.T., "Exfoliated Graphene Separated by Platinum Nanoparticles", 2008, Chem. Mater., 20, p. 6792-6797.*
Abouimrane, A., Compton, O.C., Amine, K., Nguyen, S.T., "Non-Annealed Graphene Paper as a Binder-Free Anode for Lithium-Ion Batteries", 2010, J. Phys. Chem., 114, p. 12800-12804.*
Wang, C., Chen, J.J., Shi, Y.N., Zheng, M.S., Dong, Q.F., "Preparation and Performance of a Core-Shell Carbon/Sulfur Material for Lithium/Sulfur Battery", 2010, Electrochimica Acta, 55, p. 7010-7015 (Year: 2010).*

\* cited by examiner

```
┌─────────────────────────────────────┐
│ Providing an elemental sulfur       │
│ solution and a graphene oxide       │
│ dispersion, the elemental sulfur    │
│ solution including a first solvent  │
│ and an elemental sulfur dissolved   │
│ in the first solvent, the graphene  │
│ dispersion including a second       │
│ solvent and a plurality of graphene │
│ oxide sheets dispersed in the       │
│ second solvent; the elemental       │
│ sulfur being insoluble in the       │
│ second solvent                      │
└─────────────────────────────────────┘
                  │
                  ▼
┌─────────────────────────────────────┐
│ Adding the elemental sulfur         │
│ solution in the graphene oxide      │
│ dispersion to form a mixed          │
│ solution, a plurality of elemental  │
│ sulfur particles being precipitated │
│ from the second solvent and         │
│ attracted to a surface of the       │
│ plurality of graphene oxide sheets  │
│ to form the sulfur-graphene oxide   │
│ composite material                  │
└─────────────────────────────────────┘
                  │
                  ▼
┌─────────────────────────────────────┐
│ Putting a reducing agent to the     │
│ mixed solution to reduce the        │
│ graphene oxide sheets to the        │
│ graphene sheets to form the         │
│ sulfur-graphene composite material  │
└─────────────────────────────────────┘
                  │
                  ▼
┌─────────────────────────────────────┐
│ Separating the sulfur-graphene      │
│ composite material from the mixed   │
│ solution                            │
└─────────────────────────────────────┘
```

FIG. 2

METHOD FOR MAKING SULFUR-GRAPHENE COMPOSITE MATERIAL

CROSS-REFERENCE TO RELATED APPLICATIONS

This application is a continuation application of U.S. patent application Ser. No. 13/554,120, filed on Jul. 20, 2012, entitled, "METHOD FOR MAKING SULFUR-GRAPHENE COMPOSITE MATERIAL", which claims all benefits accruing under 35 U.S.C. § 119 from China Patent Application No. 201110447288.3, filed on Dec. 28, 2011, in the China Intellectual Property Office, the contents of which are hereby incorporated by reference.

FIELD

The present disclosure relates to a method for making sulfur-graphene composite materials.

BACKGROUND

Sulfur is a promising cathode active material with a high theoretical specific capacity, low cost, and environmental benignity. Nevertheless, it is difficult to develop a practical secondary battery without problems such as the low electrical conductivity of sulfur, dissolution of polysulfides in electrolyte, and volume expansion of sulfur during discharge. These problems result in poor cycle life, low specific capacity, and low energy efficiency.

Carbon materials, such as active carbon, carbon nanotubes, mesoporous carbon, or graphene are combined with the sulfur to help remedy some of the problems. However, there has been difficulty uniformly combining sulfur and the carbon materials which limits the cycle life of the secondary battery.

What is needed, therefore, is to provide a method for making a sulfur-graphene composite material which can improve the cycle life of the secondary battery having the sulfur-graphene composite material used as a cathode active material.

BRIEF DESCRIPTION OF THE DRAWINGS

Many aspects of the present disclosure can be better understood with reference to the following drawings. The components in the drawings are not necessarily to scale, the emphasis instead being placed upon clearly illustrating the principles of the present embodiments.

FIG. 2 is a flow chart of another embodiment of a method for making the sulfur-graphene composite material.

DETAILED DESCRIPTION

The disclosure is illustrated by way of example and not by way of limitation in the figures of the accompanying drawings. It should be noted that references to "another," "an," or "one" embodiment in this disclosure are not necessarily to the same embodiment, and such references mean at least one.

Figure 1:
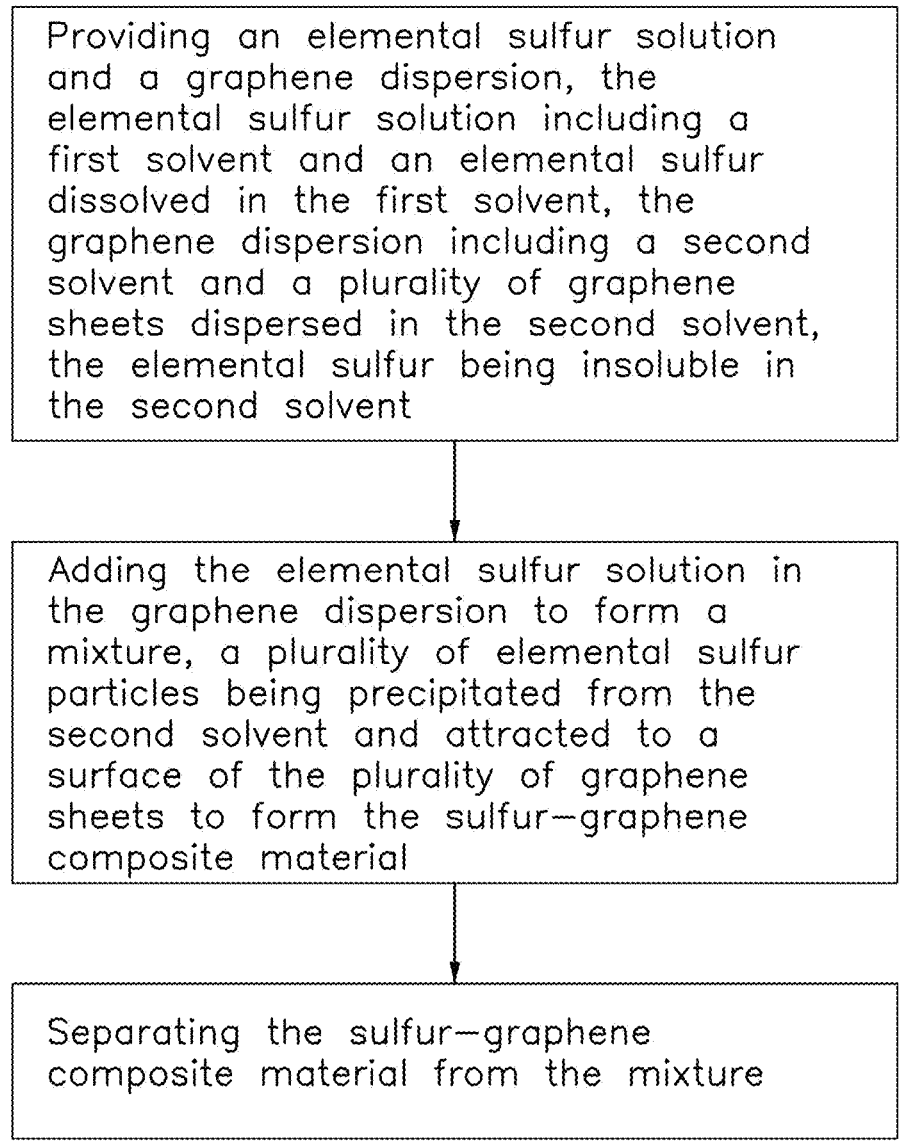
FIG. 1 is a flow chart of one embodiment of a method for making a sulfur-graphene composite material.

FIG. 1, is one embodiment of a method for making a sulfur-graphene composite material. The method includes the following steps:

S1, providing an elemental sulfur solution and a graphene dispersion, the elemental sulfur solution includes a first solvent and an elemental sulfur dissolved in the first solvent, and the graphene dispersion includes a plurality of graphene sheets and a second solvent, wherein the elemental sulfur is insoluble in the second solvent;

S2, adding the elemental sulfur solution in the graphene dispersion to form a mixture, a plurality of elemental sulfur particles are precipitated from the second solvent and attracted to a surface of the plurality of graphene sheets to form the sulfur-graphene composite material; and S3, separating the sulfur-graphene composite material from the mixture.

In step S1, the elemental sulfur is soluble in the first solvent, forming a stable and uniform elemental sulfur solution. The first solvent can be a liquid phase substance. In one embodiment, the elemental sulfur particles are totally dissolved in the first solvent. The elemental sulfur, as a raw material, can be elemental sulfur particles or a sublimed sulfur. The first solvent can be at least one of carbon disulfide ($CS_2$), carbon tetrachloride ($CCl_4$), benzene, and toluene. In one embodiment, the first solvent is $CS_2$. A concentration of the elemental sulfur solution can be in a range from about 20 grams per one liter (20 g/L) to about 80 g/L.

The elemental sulfur can be made by the following substeps:

S11, providing a thiosulfate solution;

S12, adding a hydrochloric acid in and reacting with the thiosulfate solution to obtain the elemental sulfur; and S13, separating the elemental sulfur from a mixing of the hydrochloric acid and the thiosulfate solution.

The method is used to fabricate the elemental sulfur particles. The thiosulfate can be at least one of sodium thiosulfate and potassium thiosulfate. The step S11 can further include a step of adding a first surfactant to the thiosulfate solution to suppress a diameter of the elemental sulfur particles to be formed. The surfactant can be at least one of octylphenolpoly (ethyleneglycolether)$_x$, x=9-10 (also called Triton® X-100) and tetrahydrofuran.

In step S13, the elemental sulfur particles can be filtered out from the solvent and dried.

In step S1, the elemental sulfur is insoluble in the second solvent such that the elemental sulfur can be precipitated from the second solvent and combined to the surface of the plurality of graphene sheets. The second solvent can be a liquid phase substance, which can be at least one of water, methanol, ethanol, and ether. In one embodiment, the second solvent is water.

The plurality of graphene sheets can be made by methods of thermal expansion and reduction of graphite, chemical vapor deposition, or epitaxial crystal growth. The plurality of graphene sheets are uniformly dispersed in the second solvent by ultrasonically vibrating the graphene dispersion. A mass percentage of the plurality of graphene sheets in the graphene dispersion can be in a range from about 0.1 wt % to about 10 wt %. In one embodiment, the mass percentage is about 0.1 wt % to about 3 wt %.

The step S1 can further include a step of adding a second surfactant to the graphene dispersion. The second surfactant can facilitate a dispersing of the plurality of graphene sheets in the second solvent, coated on a surface of each elemental sulfur particle to suppress the growth of the elemental sulfur particle after the elemental sulfur particles are precipitated from the solvent, and adhered on the surface of the plurality of graphene sheets and chemically combined with the graphene sheets by chemical groups of the surfactant. The elemental sulfur particles can chemically combine with the plurality of graphene sheets via the chemical groups of the second surfactant connected with the graphene sheets. The second surfactant can be an ionic surfactant, such as Triton® X-100, sorbitanoleate or sorbitan (Z)-mono-9-octadecenoate (also called Span® 80), and tetrahydrofuran. In one embodiment, the second surfactant is the Triton® X-100.

In step S2, the elemental sulfur solution is a liquid phase substance, but when added to the graphene dispersion, the elemental sulfur particles will precipitate as solid phase substances from a liquid environment. In addition, the precipitated elemental sulfur particles are easily captured by the graphene sheets and attracted to the surface of the plurality of graphene sheets for a large specific surface energy of the graphene sheets. The precipitated elemental sulfur particles can be attracted to the surface of each graphene sheet and uniformly dispersed thereon. The elemental sulfur particles can be attracted to the surface of each graphene sheet by a strong interaction therebetween, such as a hydrogen bonding. The step S2 is a phase transfer process. More specifically, the elemental sulfur is transferred from a soluble phase (i.e., the first solvent) to an insoluble phase (i.e., the second solvent), thus the elemental sulfur is transformed from a liquid state to a solid state.

The elemental sulfur solution can be added to the graphene dispersion once or several times. In one embodiment, the elemental sulfur solution is slowly dripped in the graphene dispersion to cause the elemental sulfur particles to completely precipitate out and disperse uniformly on the surface of each graphene sheet. A diameter of the elemental sulfur particles in the sulfur-graphene composite material can be in a range from about 20 nanometers to about 200 nanometers.

In step S3, the sulfur-graphene composite material can be separated from the liquid environment in a way which avoids strongly disturbing the plurality of uniformly dispersed graphene sheets. For example, heating and stirring may be avoided when separating the sulfur-graphene composite material. In one embodiment, the sulfur-graphene composite material can be separated by a leaching process to remove the liquid solvent. The separated sulfur-graphene composite material can be air dried or freeze dried. Air drying does not involve heat and can be dried in an inert atmosphere. Because there is no strong disturbance when separating the sulfur-graphene composite material, the plurality of graphene sheets can self-assemble as a stable layered sandwich structure. An elemental sulfur layer is sandwiched by two graphene sheets.

Referring to FIG. 2, another embodiment of a method for making the sulfur-graphene composite material includes the following steps:

B1, providing the elemental sulfur solution and a graphene oxide dispersion, the graphene oxide dispersion includes a plurality of graphene oxide sheets and the second solvent;

B2, adding the elemental sulfur solution to the graphene oxide dispersion to form a mixed solution, a plurality of elemental sulfur particles are precipitated from the second solvent and attracted to a surface of the plurality of graphene oxide sheets to form a sulfur-graphene oxide composite material;

B3, putting a reducing agent to the mixed solution to reduce the graphene oxide sheets to the graphene sheets to form the sulfur-graphene composite material; and B4, separating the sulfur-graphene composite material.

The method in this embodiment is similar to the method mentioned above. However, the graphene oxide sheets are used, and the reducing step B3 is further processed.

Each graphene oxide sheet has hydrophilic oxygen functional groups to increase the dispersibility in the second solvent. Thus, a uniform and stable graphene oxide dispersion can be formed. The oxygen functional groups can be at least one of a carboxyl group, hydroxyl group, carbonyl group, ester group, and epoxy group. A mass percentage of the graphene oxide sheets in the graphene oxide dispersion can be in a range from about 1 wt % to about 20 wt %. In one embodiment, the mass percentage is about 3 wt %.

In step B3, the reducing agent can be slowly dripped in the mixed solution to react with the graphene oxide sheets thoroughly. The reducing agent can be sodium borohydride, hydrazine hydrate, ascorbic acid, formaldehyde, hydroiodic acid, hydrobromic acid, or a combination thereof.

In present disclosure, a phase transfer method is used to make the sulfur-graphene composite material. The elemental sulfur particles can be phase transferred from a soluble solvent to an insoluble solvent which causes a uniform precipitation on the surface of the graphene sheets or graphene oxide sheets. A morphology of the elemental sulfur particles precipitated can be well controlled by the method. In addition, the method is simple and low cost. The sulfur-graphene composite material fabricated has a good conductivity. The sulfur-graphene composite material is separated from the liquid environment, and the graphene sheets has the large specific surface energy, Therefore, the separated sulfur-graphene composite material can self-assemble as a sandwich structure with a plurality of layers stacked. Dissolution of the sulfur in an electrolyte of the secondary battery can be minimized if the sulfur-graphene composite material is used as the cathode active material of the second battery. Therefore, a charge-discharge cycle performance of the secondary battery can be improved.

Example 1

Figure 3:
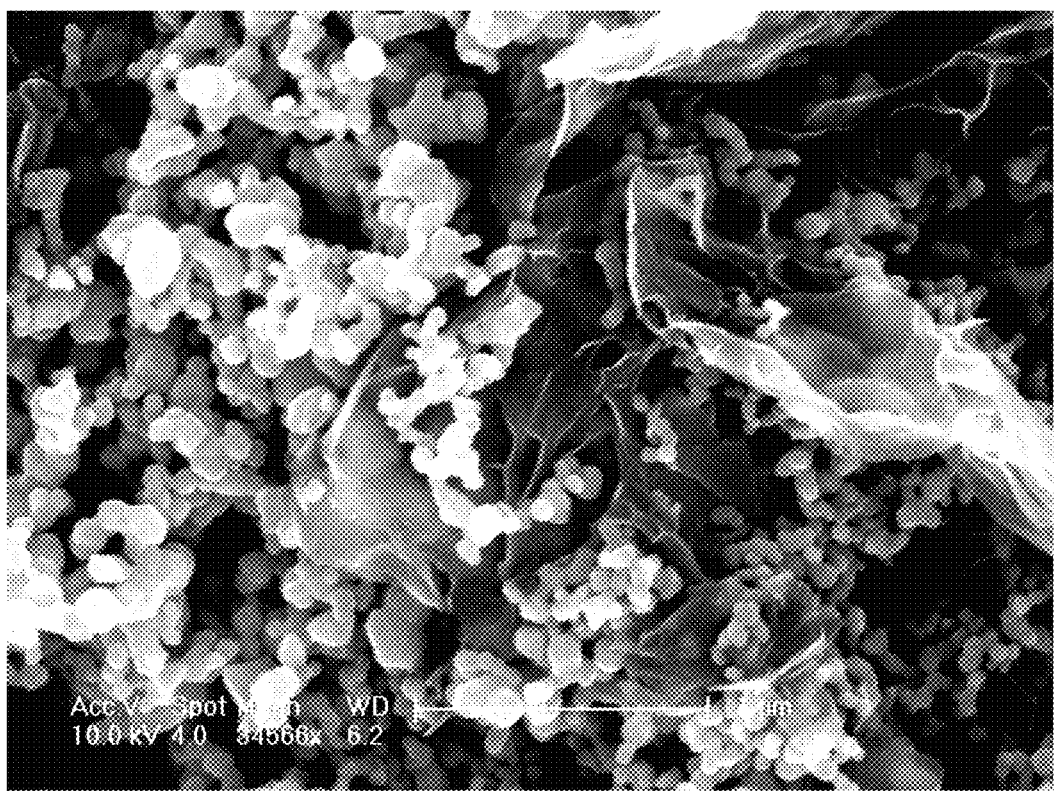
FIG. 3 is a photo showing a scanning electron microscope (SEM) image of the sulfur-graphene composite material of example 1.
Figure 4:
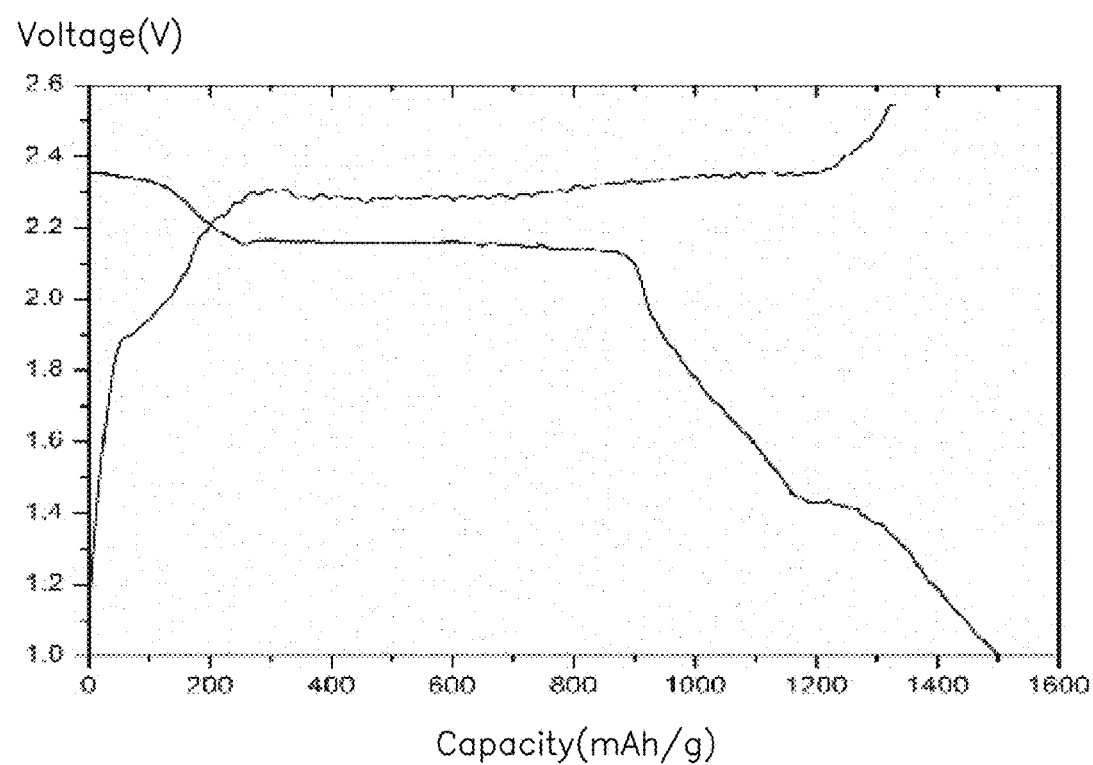
FIG. 4 is a graph showing a charge-discharge curve of the sulfur-graphene composite material of example 1.

The elemental sulfur solution having a concentration of about 40 g/L, is prepared by having the sublimed sulfur dissolved in the $CS_2$ solvent. The graphene sheets are added to the ethanol and then ultrasonically vibrated to prepare the graphene dispersion. A power of the ultrasonically vibrating is about 150 watt. The mass percentage of the graphene sheets in the graphene dispersion is about 1 wt %. The elemental sulfur solution is added to the graphene dispersion to form a mixture. A plurality of elemental sulfur particles are precipitated and combine to the surface of the graphene sheets. The mixture is leached to remove the liquid substances and air-dried to obtain the sulfur-graphene composite material. Referring to FIG. 3, in the SEM image, the diameter of the elemental sulfur particles is uniform and small. Referring to FIG. 4, the sulfur-graphene composite material is used as the cathode active material for the Li-S battery. The result shows that the Li-S battery has a good capacity retention and charge-discharge efficiency.

Example 2

The process is the same as in the Example 1, except that the concentration of the elemental sulfur solution is about 60 g/L, the mass percentage of the graphene sheets in the graphene dispersion is about 0.5 wt %. The elemental sulfur particles in the sulfur-graphene composite material appear like stubs or needles. The diameter of the elemental sulfur particles is in a range from about 50 nm to about 200 nm.

Example 3

The process is the same as in the example 1, except that graphene oxide dispersion is added to the elemental sulfur solution. The graphene oxide is prepared by Hummers method. A plurality of elemental sulfur particles are precipitated and combined to the surface of the graphene oxide. Hydrazine hydrate water solution is added to the mixture to reduce the graphene oxide to the graphene. The diameter of the elemental sulfur particles is about 50 nm to about 80 nm.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps. Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making a sulfur-graphene composite material, the method comprises:
    providing an elemental sulfur solution, wherein the elemental sulfur solution comprises a $CS_2$ solvent and an elemental sulfur dissolved in the $CS_2$ solvent, and a concentration of elemental sulfur in the elemental sulfur solution is about 60 g/L;
    adding a plurality of graphene sheets to an ethanol solvent to form a graphene solution and then ultrasonically vibrating the graphene solution to form a graphene dispersion, wherein a power of the ultrasonically vibrating is about 150 watt, and a mass percentage of the plurality of graphene sheets in the graphene dispersion is about 0.5 wt %,
    adding the elemental sulfur solution to the graphene dispersion, wherein a plurality of elemental sulfur particles are precipitated from a liquid solvent comprising the $CS_2$ solvent and the ethanol solvent and combine to surfaces of the plurality of graphene sheets to form a sulfur-graphene composite, and the plurality of elemental sulfur particles are needle-shaped; and
    separating the sulfur-graphene composite material from the liquid solvent, wherein the sulfur-graphene composite material is first separated by leaching and then air-dried, and there is no heating and stirring during the separating process so that the plurality of graphene sheets self-assemble as a layered sandwich structure comprising an elemental sulfur layer being sandwiched by two of the plurality of graphene sheets.

2. The method of claim 1, further comprises adding a surfactant in the graphene dispersion before the elemental sulfur solution is added.

3. The method of claim 2, wherein the surfactant is selected from the group consisting of sorbitan oleate or sorbitan (Z)-mono-9-octadecenoate, octylphenolpoly(ethyleneglycolether)$_x$, x=9-10, tetrahydrofuran, and any combination thereof.

4. The method of claim 1, wherein the elemental sulfur solution is dripped in the graphene dispersion.

5. The method of claim 1, wherein the plurality of elemental sulfur particles in the sulfur-graphene composite material are attracted to the surface of each graphene sheet.

6. The method of claim 1, wherein a diameter of the plurality of elemental sulfur particles is in a range from about 20 nanometers to about 200 nanometers.

7. The method of claim 1, wherein the elemental sulfur is obtained by the following substeps:
    providing a thiosulfate solution;
    adding a surfactant to the thiosulfate solution to form a first mixed solution;
    adding a hydrochloric acid to the first mixed solution and reacting with thiosulfate of the first mixed solution to obtain a second mixed solution comprising the elemental sulfur; and
    separating the elemental sulfur from the second mixed solution.

8. The method of claim 7, wherein the surfactant is octylphenolpoly(ethyleneglycolether)$_x$, and x equals 9 or 10.

* * * * *